(12) United States Patent
Reinhart

(10) Patent No.: US 9,580,125 B2
(45) Date of Patent: Feb. 28, 2017

(54) LUGGAGE CASE

(71) Applicant: Bayerische Motoren Werke Aktiengesellschaft, Munich (DE)

(72) Inventor: Peter Reinhart, Peissenberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/074,697

(22) Filed: Mar. 18, 2016

(65) Prior Publication Data

US 2016/0200384 A1   Jul. 14, 2016

Related U.S. Application Data

(63) Continuation of application No. PCT/EP2014/067801, filed on Aug. 21, 2014.

(30) Foreign Application Priority Data

Oct. 9, 2013 (DE) .................. 10 2013 220 335

(51) Int. Cl.
*B62J 9/00* (2006.01)
*E05F 1/12* (2006.01)
*B62J 7/00* (2006.01)
*A45C 13/00* (2006.01)

(52) U.S. Cl.
CPC ................. *B62J 7/00* (2013.01); *B62J 9/001* (2013.01); *A45C 13/005* (2013.01); *B62J 9/00* (2013.01); *E05F 1/1261* (2013.01); *E05Y 2201/414* (2013.01)

(58) Field of Classification Search
CPC ......... E05F 1/1058; E05F 1/1261; E05F 5/10; E05Y 2201/266; E05Y 2201/408; E05Y 2201/412; E05Y 2201/416; B62J 9/00
USPC ......................................... 224/413; 16/84, 85
See application file for complete search history.

(56) References Cited

U.S. PATENT DOCUMENTS

| | | | | |
|---|---|---|---|---|
| 2,483,947 | A | * 10/1949 | Turner | .................. E05F 1/1058 16/65 |
| 2,656,563 | A | * 10/1953 | Jones | .................... E05F 1/1261 16/289 |
| 2,722,334 | A | 11/1955 | Cain | |

(Continued)

FOREIGN PATENT DOCUMENTS

| DE | 20 2010 007 028 U1 | 8/2010 |
|---|---|---|
| EP | 0 548 457 A1 | 6/1993 |

(Continued)

OTHER PUBLICATIONS

International Search Report (PCT/ISA/210) issued in PCT Application No. PCT/EP2014/067801 dated Nov. 3, 2014 with English translation (five pages).

(Continued)

*Primary Examiner* — Justin Larson
(74) *Attorney, Agent, or Firm* — Crowell & Moring LLP

(57) ABSTRACT

A luggage case, more particularly for a powered two-wheeled vehicle, has a lid which is movably mounted relative to a body of the luggage case by at least one hinge. In the vicinity of the hinge there is provided a damping element which, when the lid is closed, comes into contact with a component that moves with the lid, thereby damping the closing movement.

8 Claims, 3 Drawing Sheets

(56) References Cited

U.S. PATENT DOCUMENTS

| | | | | |
|---|---|---|---|---|
| 4,104,761 | A * | 8/1978 | Lyons | E05F 1/123 16/51 |
| 4,873,791 | A * | 10/1989 | Lyons, Sr. | E05F 1/123 16/308 |
| 5,205,073 | A * | 4/1993 | Lyons, Sr. | E02D 29/1418 49/379 |
| 5,331,982 | A | 7/1994 | Machelett | |
| 5,788,312 | A * | 8/1998 | Lee | E05F 15/47 296/76 |
| 6,367,123 | B1 * | 4/2002 | Cheal | E05D 3/145 16/289 |
| 6,481,605 | B1 * | 11/2002 | Visenzi | B62J 9/00 190/117 |
| 6,513,689 | B2 * | 2/2003 | Vincenzo | B62J 9/00 224/412 |
| 6,637,797 | B2 * | 10/2003 | Baik | E05F 1/1091 296/76 |
| 6,793,110 | B2 * | 9/2004 | Hamilton | B62J 9/00 224/413 |
| 6,832,710 | B2 * | 12/2004 | Galbraith | B62J 9/00 16/366 |
| 6,931,693 | B2 * | 8/2005 | Uemura | E05F 1/1215 16/377 |
| 7,937,807 | B2 * | 5/2011 | Bereznai | E05F 5/10 16/82 |
| 8,096,455 | B2 * | 1/2012 | Viklund | B60R 9/055 224/328 |
| 8,413,298 | B2 * | 4/2013 | Domenig | E05F 5/02 16/85 |
| 8,672,198 | B2 * | 3/2014 | Viklund | B60R 9/055 224/328 |
| 8,677,563 | B2 * | 3/2014 | Diep | E05F 5/08 16/82 |
| 8,875,962 | B2 * | 11/2014 | Viklund | B60R 9/055 224/328 |
| 9,316,036 | B2 * | 4/2016 | Collene | E05F 1/1058 |
| 2008/0109987 | A1 * | 5/2008 | Chen | E05F 5/10 16/68 |
| 2011/0094056 | A1 * | 4/2011 | Lautenschlager | E05F 5/02 16/84 |
| 2014/0000066 | A1 * | 1/2014 | Diep | E05F 5/08 16/86 A |
| 2014/0290002 | A1 * | 10/2014 | Lautenschlager | E05F 5/02 16/84 |
| 2016/0052581 | A1 * | 2/2016 | Seo | B62J 6/04 224/413 |
| 2016/0167727 | A1 * | 6/2016 | Da Deppo | B62J 9/001 224/413 |

FOREIGN PATENT DOCUMENTS

| | | |
|---|---|---|
| EP | 2 433 854 A2 | 3/2012 |
| EP | 2 639 106 A1 | 9/2013 |

OTHER PUBLICATIONS

German-language Written Opinion (PCT/ISA/237) issued in PCT Application No. PCT/EP2014/067801 dated Nov. 3, 2014 (four pages).

German Search Report issued in counterpart German Application No. 10 2013 220 335.7 dated May 4, 2015 with partial English translation (13 pages).

* cited by examiner

LUGGAGE CASE

CROSS REFERENCE TO RELATED APPLICATIONS

This application is a continuation of PCT International Application No. PCT/EP2014/067801, filed Aug. 21, 2014, which claims priority under 35 U.S.C. §119 from German Patent Application No. 10 2013 220 335.7, filed Oct. 9, 2013, the entire disclosures of which are herein expressly incorporated by reference.

BACKGROUND AND SUMMARY OF THE INVENTION

The invention relates to a luggage case, particularly for a powered two-wheel vehicle.

Luggage cases of this type, which are fastened to a rack of the two-wheel vehicle in an upright standing or in a hanging manner, have a body in which the actual luggage compartment is formed and to which a lid is hinged. The luggage compartment can be closed by the lid.

Normally, the lid of the luggage case falls hard into the closed position under its own weight. This risks damaging the closing mechanism.

It is known to aid the opening of the lid by use of gas pressure springs between the body and the lid of the luggage case, which gas pressure springs automatically raise the lid. Although the lid can no longer fall shut here with a swinging motion, for closing the lid, the user always has to apply a force to overcome the pressure force of the gas pressure springs. In addition, gas pressure springs are relatively expensive.

In order to improve the haptics when closing the luggage case lid and avoid damaging the closing mechanism of the luggage case, it would be desirable to prevent, in a simple manner, the lid of the luggage case from swinging down hard into the closed position, while still making a comfortable closing possible.

With respect to a luggage case, particularly for a powered two-wheel vehicle, which has a lid that is arranged by way of at least one hinge in a movable manner relative to a body of the luggage case, this object is achieved, in that a damping element is provided in the area of the hinge. The damping element comes to rest on a component moving with the lid during the closing of the lid and therefore damps the closing motion. By using a damping element which, starting from a defined closing path, acts upon the lid and brakes this lid particularly before contact with the components of the closing mechanism, a hard-falling shutting of the lid of the luggage case can be avoided. An arrangement of the damping element in the area of the hinge, thus in the proximity of the edge of the lid linked by way of the hinge to the body, provides that the damping element does not interfere with access to the luggage compartment of the luggage case.

The damping element could act upon any arbitrary component moving together with the lid, in order to damp the closing motion of the lid. However, preferably the component is part of the hinge itself because, in this fashion, no additional components will have to be installed.

By selecting the damping degree of the damping element, the damping can easily be individually adapted to different luggage cases without significantly changing the arrangement of the hinge, the component and the damping element.

A damping element is preferably used which travels along a linear displacement path, by which the kinetic energy of the closing lid is therefore reduced by a braked displacement of the damping element. Preferably, the damping element thereby deforms only insignificantly. Rather, the kinetic energy is converted by friction generated during the displacement. Such damping elements are known and can be obtained as a prefabricated constructional unit. They are quiet and have a high service life in the case of numerous closing cycles.

The damping element is advantageously pretensioned into a moved-out position, so that, during the opening of the lid, the damping element is automatically moved into its starting position for damping the lid during the closing.

The hinge is constructed, for example, as a bow-type hinge which carries out a swiveling motion for the closing. Such hinges are often used in the case of luggage cases in order to permit a larger maximal opening angle of the lid.

Particularly for using a bow-type hinge, it is advantageous for the hinge to slide along the damping element in a last section of the closing motion. In this case, the damping element is simultaneously pushed into its slid-in position by the hinge, in which case, the kinetic energy of the lid is reduced.

The braking torque of the damping element is preferably designed to be lower than a torque resulting from the weight of the lid, so that the lid can close without the effect of an external force. The braking torque should naturally be selected to be so high that a hard falling of the lid into the lock becomes impossible.

It is contemplated to provide only a single hinge and a single damping element, which accommodates particularly the design of narrow luggage cases.

It is not necessary to damp the entire closing motion. It was found to be sufficient for the component to come in contact with the damping element starting from a defined closing path of the lid, and the remaining closing motion thereby takes place at a reduced speed.

The contact between the component and the damping element may, for example, take place at a closing angle of approximately 5 to 45 degrees.

The luggage case may be a top case. However, the invention can also be adapted to other luggage cases for powered two-wheel vehicles.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
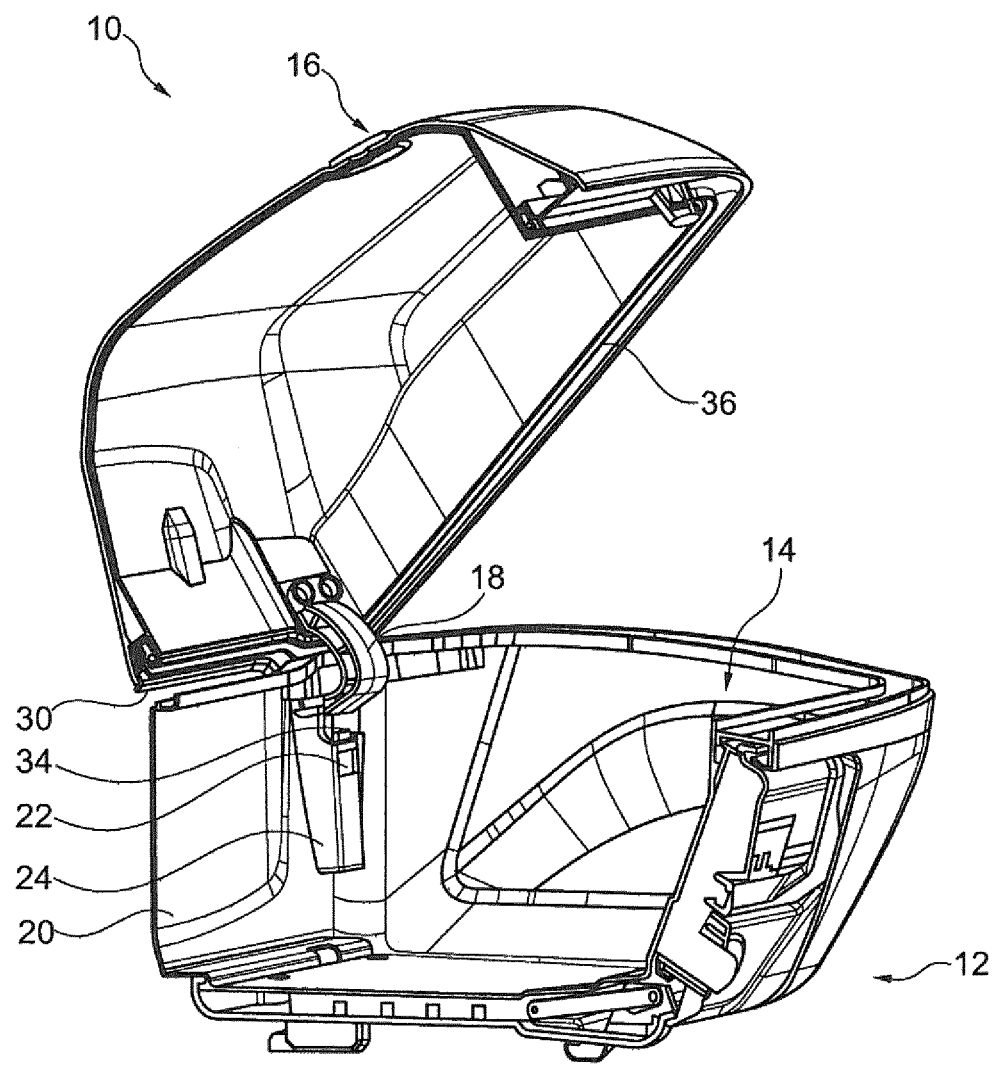
FIG. 1 is a schematic perspective partially sectional view of a luggage case according to an embodiment of the invention.

FIG. 1 illustrates a luggage case 10. Here, the luggage case 10 is a top case for an upright-standing mounting on a luggage case rack of a powered two-wheel vehicle.

The luggage case 10 has a body 12, in which the actual luggage compartment 14 is formed, as well as a lid 16, which is connected with the body 12 by way of a hinge 18 on a side wall 20 of the body 12 and the lid 16, so that the lid 16 can be swiveled for the opening and closing.

FIG. 1 illustrates the lid 16 opened approximately by the maximal opening angle αmax with respect to the body 12.

A damping element 22 is arranged below the hinge 18 on the side wall 20 of the body 12 on the left in FIG. 1. The damping element 22 is linearly displaceably guided in a housing 24, which is fixedly connected with the side wall 20. The displacing motion is approximately vertically oriented, but the precise geometry is the choice of the person skilled in the art, as a function of the respective geometric situation of the luggage case.

The remaining components illustrated in the figures are known from conventional luggage cases and will not be described here in detail.

In this case, only a single hinge 18 is known together with a single damping element 22. However, in the case of larger luggage cases 10, several hinges 18 as well as possibly several damping elements 22 may be used.

Figure 2:
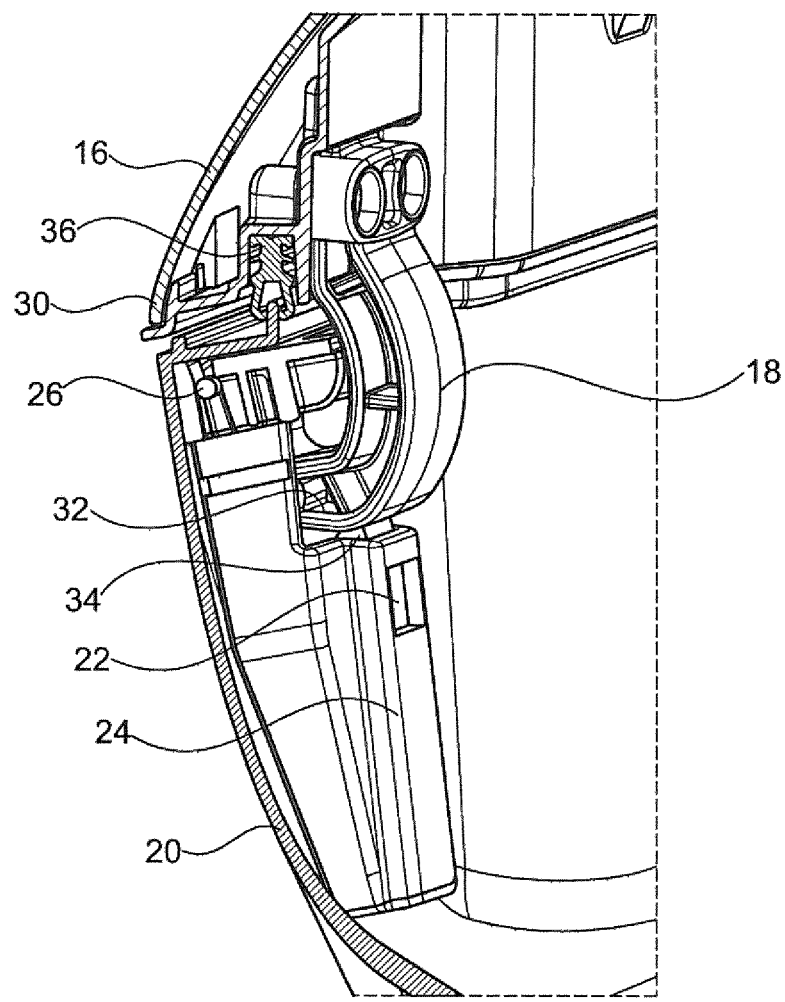
FIG. 2 is a schematic perspective view of the hinge and of the damping element of the luggage case of FIG. 1.
Figure 3:
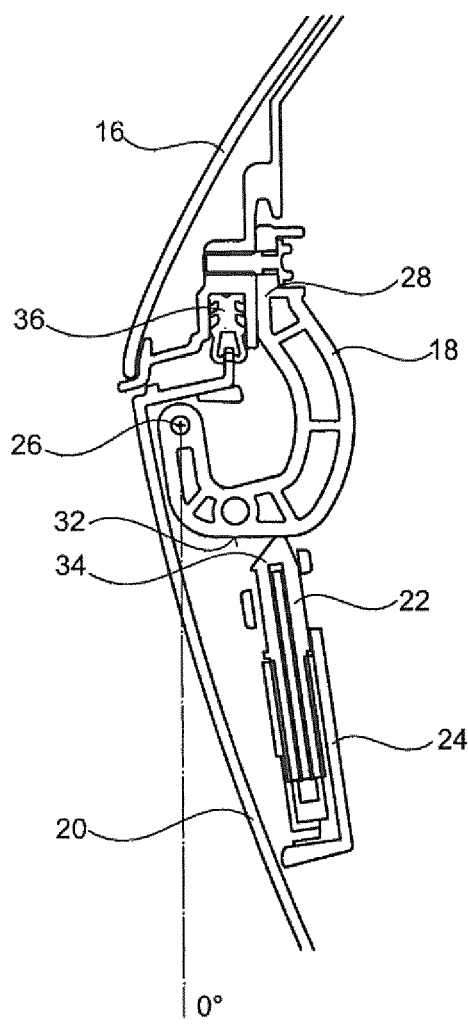
FIG. 3 is a schematic sectional view of the luggage case of FIG. 1 while the lid is closed.
Figure 4:
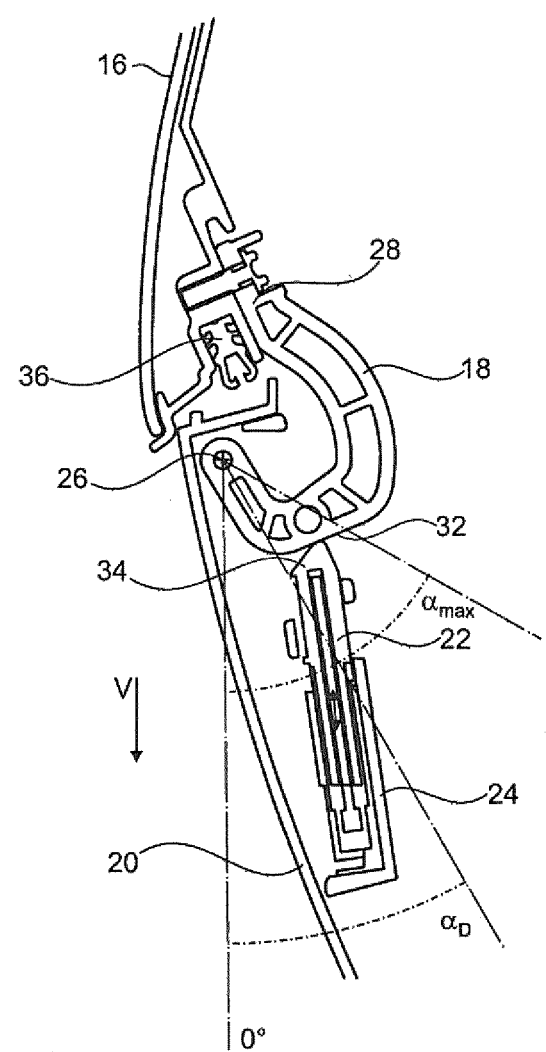
FIG. 4 is a schematic sectional view of the luggage case of FIG. 1 during the closing of the lid.

The hinge 18 is illustrated in detail in FIGS. 2 to 4 and, in the present example, is constructed as an approximately U-shaped bow-type hinge. One end of the bow is connected in a pivot point 26 with the body 12 of the luggage case 10 close to the upper edge of the side wall 20. The other end 28 of the bow of the hinge 18 is fixedly and rigidly connected with the lid 16 close to the edge 30 of the latter.

In the closed position of the lid 16 illustrated in FIGS. 2 and 3, the hinge 18 rests with a, here essentially linear, center section against the damping element 22, so that the latter is slid into its pushed-in position in the housing 24. This center section of the hinge 18 forms a component 32 here, which comes in contact with the damping element 22 in order to damp the closing motion of the lid 16. The component 32 could also be formed by another component moving together with the lid 16, for example, of the hinge 18 or of the lid 16, in which case, the damping element 22 would then possibly be placed in a different location.

When the lid 16 is opened, the hinge 18 is swiveled about the pivot point 26, the center section of the hinge 18 sliding along the tip 34 of the damping element 22 and moving upward (FIG. 4) against the vertical direction V.

The damping element 22 is pretensioned into its moved-out position illustrated in FIG. 4 (not shown in detail), so that it endeavors to automatically take up this position. During the opening of the lid 16, the damping element 22 will therefore automatically move from the pushed-in position against the vertical direction V (see FIG. 4) into its moved-out position.

Any arbitrary known, linearly displaceable, repeatedly usable damping component can be used as the damping element 22.

However, the damping element 22 differs from an elastic gasket 36 possibly provided at the edge 30 of the lid 16 or of the luggage compartment 14. The damping element 22 is arranged here also in a spatially separated manner from the gasket 36.

When a predefined opening angle αD is exceeded, the hinge 18 will detach from the damping element 22. As visible in FIG. 1, a distance between the hinge 18 and the damping element 22 exists at the maximal opening angle αmax.

During the closing motion of the lid 16, the contact between the component 32 and the damping element 22 takes place such that, at a predefined opening angle αD, the hinge 18 impacts with its center section on the tip 34 of the damping element 22. As of that point in time, a braking torque will act upon the lid 16 and brake its closing motion, the kinetic energy of the lid 16 being reduced by the displacement of the damping element 22.

Since the hinge 18 is linked at its one end to the pivot point 26, the center section of the hinge 18 slides along the tip 34 of the damping element during the further closing motion of the lid 16. However, because of the swiveling motion of the hinge 18, the contact point between the hinge 18 and the damping element 22 is also displaced in the vertical direction V farther downward, so that the damping element 22 in linearly displaced in the V direction into the housing in the direction of its pushed-in position. This displacement motion takes place while generating a friction force, which reduces the kinetic energy of the lid 16.

The damping effect can be adjusted by way of, among others, the braking torque of the damping element 22 but also by way of the shape of the center section of the hinge 18.

In the example illustrated here, the angle αD, at which the damping starts, is situated approximately at half the maximal opening angle αmax. The 0°-line in FIGS. 3 and 4 indicates the angle of departure in the closed position, from where the swiveling motion of the hinge 18 is viewed. Here, the angle αmax amounts to approximately 60°, so that, in this example, the angle αD is at approximately 30°. Approximately half the closing path is therefore damped in this example. However, the contact angle and therefore the damped closing path can naturally be adjusted as desired by the person skilled in the art by way of the arrangement of the damping element 22 and the design and arrangement of the component 32.

Here, the braking torque of the damping element 22 is selected to be slightly lower than the torque resulting from the weight of the lid 16, so that the lid 16 will softly fall into the lock because of the force of its weight and the luggage case 10 will be securely closed also without assistance by the user.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A luggage case, comprising:
a body of the luggage case;
a lid of the luggage case;
at least one hinge by which the lid is movable relative to the body;
a damping element provided in an area of the hinge, wherein
the damping element comes to rest on a component part of the hinge moving with the lid during closing of the lid in order to damp a closing motion of the lid; wherein the hinge is a bow hinge that carries out a swiveling motion during closing of the lid, the bow hinge having a first end connected to the lid at a location away from an edge of the lid that is adjacent to an edge of the body when the lid is in a closed position, a second end pivotally connected to the body, and a bow shape configured such that when opened the lid swivels about the second end and the edge of the lid is displaced laterally relative to the body edge at a hinge side of the luggage case; and wherein the component part moving with the lid comes into contact with the damping element at a closed angle from 5° to 45°.

2. The luggage case according to claim 1, wherein the luggage case is configured for a powered two-wheel vehicle.

3. The luggage case according to claim 1, wherein the damping element is configured to pass through a linear displacement path.

4. The luggage case according to claim 1, wherein the damping element is pretensioned into a moved-out position.

5. The luggage case according to claim 1, wherein in a last section of the closing motion, the hinge slides along the damping element.

6. The luggage case according to claim 1, wherein a braking torque of the damping element is designed to be lower than a torque resulting from a force of the lid weight.

7. The luggage case according to claim 1, wherein only a single hinge and a single damping element are provided for the luggage case.

8. The luggage case according to claim 1, wherein the luggage case is a top case.

\* \* \* \* \*